(12) United States Patent
Ray et al.

(10) Patent No.: US 8,428,548 B2
(45) Date of Patent: Apr. 23, 2013

(54) EMERGENCY MESSAGE MENU

(75) Inventors: Amar Nath Ray, Shawnee, KS (US); Lynne T. Greene, Olathe, KS (US); Carl M. Coppage, Kansas City, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 822 days.

(21) Appl. No.: 12/257,725

(22) Filed: Oct. 24, 2008

(65) Prior Publication Data
US 2010/0003952 A1    Jan. 7, 2010

Related U.S. Application Data

(60) Provisional application No. 61/078,123, filed on Jul. 3, 2008.

(51) Int. Cl.
*H04M 11/04* (2006.01)

(52) U.S. Cl.
USPC ............... 455/404.1; 455/404.2; 455/466; 455/403

(58) Field of Classification Search ........... 455/404.1, 455/404.2, 466, 403
See application file for complete search history.

(56) References Cited

U.S. PATENT DOCUMENTS

| | | | |
|---|---|---|---|
| 5,339,351 A | 8/1994 | Hoskinson et al. | |
| 5,379,337 A | 1/1995 | Castillo et al. | |
| 5,497,149 A | 3/1996 | Fast | |
| 5,555,286 A | 9/1996 | Tendler | |
| 5,646,987 A | 7/1997 | Gerber et al. | |
| 5,710,803 A | 1/1998 | Kowal et al. | |
| 5,936,622 A | 8/1999 | Halverson et al. | |
| 5,941,930 A | 8/1999 | Morimoto et al. | |
| 6,240,285 B1 | 5/2001 | Blum et al. | |
| 6,317,049 B1 | 11/2001 | Toubia et al. | |
| 6,366,772 B1 | 4/2002 | Arnson | |
| 6,377,169 B1 | 4/2002 | Yanagisawa | |
| 6,405,033 B1 * | 6/2002 | Kennedy et al. | 455/414.1 |
| 6,415,018 B1 | 7/2002 | Antonucci et al. | |
| 6,424,908 B2 | 7/2002 | Urban et al. | |
| 6,456,695 B2 | 9/2002 | Lee | |
| 6,480,578 B1 | 11/2002 | Allport | |
| 6,526,125 B1 | 2/2003 | Lindsay et al. | |
| 6,631,184 B1 | 10/2003 | Weiner | |
| 6,636,732 B1 | 10/2003 | Boling et al. | |
| 6,690,932 B1 | 2/2004 | Barnier et al. | |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Chuong A Ngo
(74) *Attorney, Agent, or Firm* — Swanson & Bratschun, L.L.C.

(57) ABSTRACT

A wireless communications device and method for generating and communicating an emergency text message, includes in response to receiving a request to communicate an emergency text message, accessing stored personal data for use in generating content of the emergency text message. A determination may be made as to whether current location coordinates are available. The emergency text message may be populated with the accessed stored personal data and current location coordinates, if available. The populated emergency text message may be communicated over a communications network to a public safety answering point.

16 Claims, 6 Drawing Sheets

U.S. PATENT DOCUMENTS

| | | | |
|---|---|---|---|
| 7,026,925 B2 | 4/2006 | Roche et al. | |
| 7,079,627 B2 | 7/2006 | Crago et al. | |
| 7,095,733 B1 | 8/2006 | Yarlgadda et al. | |
| 7,231,218 B2 | 6/2007 | Diacakis et al. | |
| 7,269,413 B2 | 9/2007 | Kraft | |
| 7,391,784 B1 | 6/2008 | Renkel | |
| 7,418,087 B2 | 8/2008 | Luneau et al. | |
| 7,444,238 B1 | 10/2008 | Opitz | |
| 7,496,189 B2 | 2/2009 | Clarisse et al. | |
| 7,679,505 B1 | 3/2010 | Vallaire | |
| 7,706,356 B1 | 4/2010 | Olshansky et al. | |
| 7,734,019 B1 | 6/2010 | Terpstra | |
| 8,364,117 B2 | 1/2013 | Hawkins | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0016189 A1 | 2/2002 | Sheynblat et al. | |
| 2002/0068584 A1 | 6/2002 | Gage et al. | |
| 2002/0136363 A1 | 9/2002 | Stumer et al. | |
| 2003/0063714 A1 | 4/2003 | Stumer et al. | |
| 2003/0109245 A1 | 6/2003 | McCalmont et al. | |
| 2003/0122779 A1 | 7/2003 | Martin et al. | |
| 2003/0133450 A1 | 7/2003 | Baum | |
| 2003/0162554 A1 | 8/2003 | Kim | |
| 2004/0029610 A1 | 2/2004 | Ihira et al. | |
| 2004/0056770 A1 | 3/2004 | Metcalf | |
| 2004/0063439 A1 | 4/2004 | Glazko et al. | |
| 2004/0072583 A1 | 4/2004 | Weng | |
| 2004/0113836 A1 | 6/2004 | Rickerson, Jr. | |
| 2004/0157564 A1 | 8/2004 | Murakami et al. | |
| 2004/0176123 A1 | 9/2004 | Chin et al. | |
| 2004/0185871 A1 | 9/2004 | Somani et al. | |
| 2004/0198329 A1 | 10/2004 | Vasa | |
| 2005/0003797 A1 | 1/2005 | Baldwin | |
| 2005/0048947 A1 | 3/2005 | Holland et al. | |
| 2005/0070315 A1* | 3/2005 | Rai et al. | 455/466 |
| 2005/0085257 A1 | 4/2005 | Laird et al. | |
| 2005/0097380 A1 | 5/2005 | Kim | |
| 2005/0101287 A1 | 5/2005 | Jin et al. | |
| 2005/0111630 A1 | 5/2005 | Potorny et al. | |
| 2005/0169248 A1 | 8/2005 | Truesdale et al. | |
| 2005/0197096 A1 | 9/2005 | Yang et al. | |
| 2005/0201358 A1 | 9/2005 | Nelson et al. | |
| 2005/0209781 A1 | 9/2005 | Anderson | |
| 2005/0239477 A1 | 10/2005 | Kim et al. | |
| 2005/0265326 A1 | 12/2005 | Laliberte | |
| 2005/0277405 A1 | 12/2005 | Noguchi | |
| 2006/0009243 A1 | 1/2006 | Dahan et al. | |
| 2006/0052134 A1 | 3/2006 | Sato | |
| 2006/0056620 A1 | 3/2006 | Shingal et al. | |
| 2006/0133582 A1 | 6/2006 | McCulloch | |
| 2006/0145841 A1* | 7/2006 | Daurensan et al. | 340/539.22 |
| 2006/0152373 A1 | 7/2006 | King | |
| 2006/0166685 A1 | 7/2006 | Adkins | |
| 2006/0217105 A1 | 9/2006 | Kumar et al. | |
| 2006/0217136 A1 | 9/2006 | Bantukul et al. | |
| 2006/0219542 A1 | 10/2006 | Savir | |
| 2006/0222151 A1 | 10/2006 | Goldman et al. | |
| 2006/0227122 A1 | 10/2006 | Proctor | |
| 2006/0229100 A1 | 10/2006 | Born | |
| 2006/0238384 A1 | 10/2006 | Hess et al. | |
| 2006/0276168 A1 | 12/2006 | Fuller et al. | |
| 2006/0293024 A1 | 12/2006 | Benco et al. | |
| 2007/0001902 A1 | 1/2007 | Kuo et al. | |
| 2007/0003024 A1 | 1/2007 | Olivier et al. | |
| 2007/0082652 A1 | 4/2007 | Hartigan et al. | |
| 2007/0201391 A1 | 8/2007 | Belmonte et al. | |
| 2007/0201645 A1 | 8/2007 | Gass et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0001734 A1 | 1/2008 | Stilp et al. | |
| 2008/0013696 A1 | 1/2008 | Motley et al. | |
| 2008/0057944 A1 | 3/2008 | Miriyala et al. | |
| 2008/0057987 A1 | 3/2008 | Landschaft et al. | |
| 2008/0070553 A1 | 3/2008 | Yamakawa et al. | |
| 2008/0122929 A1 | 5/2008 | Chukwu | |
| 2008/0220715 A1 | 9/2008 | Sinha et al. | |
| 2008/0227427 A1 | 9/2008 | Kadavallur et al. | |
| 2008/0254810 A1 | 10/2008 | Fok et al. | |
| 2008/0273670 A1 | 11/2008 | Dickinson | |
| 2008/0275950 A1 | 11/2008 | Jordan | |
| 2008/0287748 A1 | 11/2008 | Sapounas et al. | |
| 2009/0047924 A1 | 2/2009 | Ray et al. | |
| 2009/0064039 A1* | 3/2009 | Lee et al. | 715/810 |
| 2009/0121930 A1 | 5/2009 | Bennett et al. | |
| 2009/0131072 A1 | 5/2009 | Razdan et al. | |
| 2009/0144157 A1* | 6/2009 | Saracino et al. | 705/14 |
| 2009/0149153 A1 | 6/2009 | Lee | |
| 2009/0186596 A1 | 7/2009 | Kaltsukis | |
| 2009/0197567 A1 | 8/2009 | Ogram | |
| 2009/0215428 A1 | 8/2009 | Noldus et al. | |
| 2009/0227225 A1 | 9/2009 | Mitchell et al. | |
| 2009/0233573 A1 | 9/2009 | Gray | |
| 2009/0310602 A1 | 12/2009 | Olshansky et al. | |
| 2010/0098062 A1 | 4/2010 | Croak et al. | |
| 2010/0291894 A1 | 11/2010 | Pipes | |

OTHER PUBLICATIONS

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 28, 2011 for U.S. Appl. No. 11/430,232.

Non-Final Rejection mailed Apr. 1, 2011 for U.S. Appl. No. 12/257,655.

Non-Final Rejection mailed Mar. 3, 2011 for U.S. Appl. No. 12/257,416.

Non-Final Rejection mailed Mar. 17, 2011 for U.S. Appl. No. 12/257,640.

"AT & T Wireless Unleashes the First and Only Wireless Messaging Device", PhysOrg.com, Sep. 30, 2004; available online at URL: <http://www.physorg.com/news1392.html> (12 pages).

Non-Final Office Action date mailed Aug. 3, 2010 for U.S. Appl. No. 11/891,784.

Response filed Nov. 2, 2010 for U.S. Appl. No. 11/891,784.

U.S. Appl. No. 12/070,775; Notice of Allowance dated Sep. 12, 2012; 24 pages.

U.S. Appl. No. 12/257,674; Final Rejection dated Nov. 5, 2012; 17 pages.

U.S. Appl. No. 12/257,687; Final Rejection dated Aug. 31, 2012; 19 pages.

U.S. Appl. No. 12/257,717; Non-Final Rejection dated Aug. 16, 2012; 42 pages.

U.S. Appl. No. 12/257,836; Non-Final Rejection dated Sep. 12, 2012; 25 pages.

U.S. Appl. No. 12/070,775; Final Rejection dated May 14, 2012; 27 pages.

U.S. Appl. No. 12/257,416; Final Rejection dated Jun. 13, 2012; 38 pages.
U.S. Appl. No. 12/257,640; Final Rejection dated May 2, 2012; 18 pages.
U.S. Appl. No. 12/257,655; Non-Final Rejection dated Jul. 17, 2012; 26 pages.
U.S. Appl. No. 12/257,674; Non-Final Rejection dated Jul. 20, 2012; 21 pages.
U.S. Appl. No. 12/257,836; Final Rejection dated May 14, 2012; 26 pages.
U.S. Appl. No. 12/257,674; Notice of Allowance dated Jan. 25, 2012; 7 pages.
U.S. Appl. No. 12/257,674; Final Rejection dated Oct. 3, 2011; 15 pages.
U.S. Appl. No. 12/257,674; Non-Final Rejection dated Apr. 28, 2011; 14 pages.
U.S. Appl. No. 12/257,717; Final Rejection dated Jan. 23, 2012; 16 pages.
U.S. Appl. No. 12/257,717; Non-Final Rejection dated Sep. 13, 2011; 19 pages.
U.S. Appl. No. 12/257,640; Non-Final Rejection dated Jan. 4, 2012; 19 pages.
U.S. Appl. No. 12/257,640; Final Rejection dated Aug. 17, 2011; 17 pages.
U.S. Appl. No. 12/257,655; Final Rejection dated Sep. 16, 2011; 22 pages.
U.S. Appl. No. 12/257,655; Amendment and Request for Continued Examination dated Dec. 16, 2011; 18 pages.
U.S. Appl. No. 12/070,775; Non-Final Rejection dated Jul. 25, 2011; 33 pages.
U.S. Appl. No. 12/257,836 Non-Final Rejection dated Nov. 29, 2011; 13 pages.
U.S. Appl. No. 12/257,836; Non-Final Rejection dated Jun. 8, 2011; 15 pages.
U.S. Appl. No. 12/257,687; Non-Final Rejection dated Apr. 9, 2012; 16 pages.
U.S. Appl. No. 12/257,687; Non-Final Rejection dated May 10, 2011; 14 pages.
U.S. Appl. No. 12/257,687; Final Rejection dated Sep. 29, 2011; 12 pages.
U.S. Appl. No. 12/257,736; Non-Final Rejection dated Apr. 28, 2011; 15 pages.
U.S. Appl. No. 12/257,736; Final Rejection dated Nov. 23, 2011; 18 pages.
U.S. Appl. No. 12/257,736; Amendment and Request for Continued Examination dated Feb. 22, 2012; 12 pages.
U.S. Appl. No. 12/257,416; Non-Final Rejection dated Feb. 3, 2012; 24 pages.
U.S. Appl. No. 12/257,416; Final Rejection dated Jul. 14, 2011; 17 pages.
U.S. Appl. No. 12/070,775; Issue Notification dated Jan. 9, 2013; 1 page.
U.S. Appl. No. 12/257,640; Non-Final Rejection dated Dec. 5, 2012; 23 pages.
U.S. Appl. No. 12/257,655; Final Rejection dated Jan. 2, 2013; 18 pages.
U.S. Appl. No. 12/257,687; Notice of Allowance dated Feb. 20, 2013; 20 pages.
U.S. Appl. No. 12/257,687; Notice of Panel Decision on Pre-Appeal Brief Review dated Dec. 14, 2012; 2 pages.
U.S. Appl. No. 12/257,717; Notice of Allowance dated Feb. 14, 2013: 35 pages.
U.S. Appl. No. 12/257,836; Notice of Allowance dated Mar. 12, 2013; 31 pages.

* cited by examiner

EMERGENCY MESSAGE MENU

PRIORITY

This Application claims priority to co-pending Provisional Patent Application Ser. No. 61/078,123, entitled: Emergency 911 Text Messaging Services, was filed on Jul. 3, 2008; the entire teachings of which are incorporated herein by reference.

BACKGROUND OF THE INVENTION

Because of the rising popularity of text messaging, e-mail, instant messaging, and various other features available on cellular telephones, people have become accustom to communicating in methods beyond traditional telephone calls. While alternative forms of communication are acceptable, or sometimes even preferable, in the event a recipient is unable to receive the alternative communication form, the communication becomes useless. One problematic example of compatibility issues involves emergency communications with emergency services, such as 911. Presently, a person attempting to text message emergency services will likely be unable to do so. Even if the text message is able to be accepted, only a limited amount of information, such as the person's name and telephone number, may be provided, apart from the information manually typed into a text message.

BRIEF SUMMARY OF THE INVENTION

In order to provide an emergency call center, such as a 911 Public Safety Answering Point (PSAP), with relevant and as detailed information as possible in the event a text message or other similar emergency communication is sent to the emergency call center, a preformatted emergency text message, created in part by responses entered by a user operating a user-controlled menu, may be generated. In one embodiment, using a menu arranged by emergency types, appropriate templates may be filled in by the user, ensuring relevant information is sent. An appropriate emergency call center may be determined and the generated preformatted emergency text message communicated to the appropriate emergency call center.

One embodiment of a method for sending an emergency text message includes receiving a request for an emergency message menu by a user for selection of an emergency event type. An emergency message menu with a list of selectable emergency event types may be displayed. In response to receiving a selected emergency event type, an emergency text message template that includes text message fields, may be generated. At least one of the text message fields may be indicative of the selected emergency event type. The emergency text message may be sent via a communications network to a public safety answering point.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE INVENTION

Figure 1:
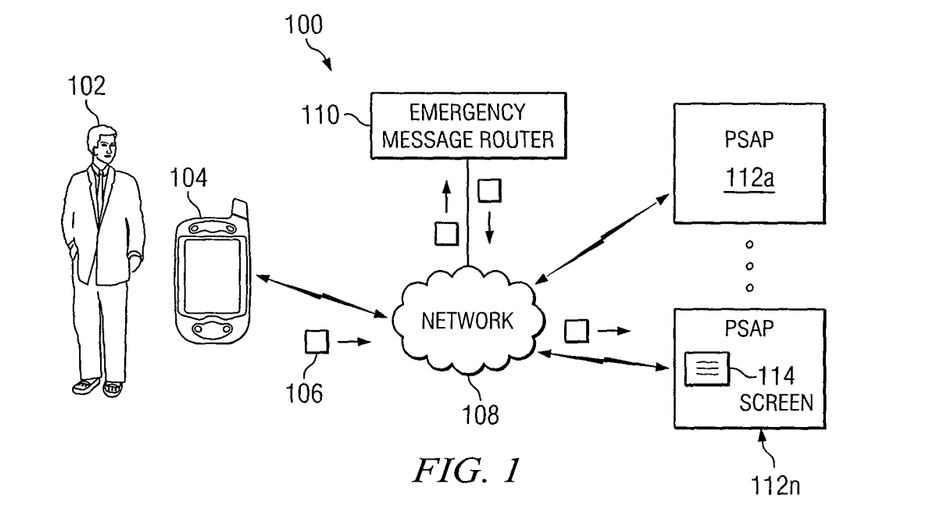
FIG. 1 is an illustration of one embodiment of an environment for generating and communicating a preformatted emergency text message.

FIG. 1 is an illustration of one embodiment of an environment 100 for generating and communicating a preformatted or un-preformatted emergency text message. A user 102 using a wireless communications device 104 may communicate an emergency text message 106 over a communications network 108 via an emergency message router 110 to one of multiple public safety answering point (PSAP) 112a-112n (collectively 112). The wireless communications device 104 may be a mobile telephone, cellular phone, text messenger, personal digital assistant (PDA), wireless electronic game device, or any other communications device configured to communicate an emergency text message 106 or other data messages over the communications network 108. An emergency text message 106 may be a short message service (SMS) message, text message, a multi-media messaging service (MS), or any other type of text message in which the communications network 108 is configured to communicate. It should be understood that the wireless communications device 104 may similarly be configured to communicate other data messages, such as emails, photographs, videos, instant messages, and the like. The communications network 108 may be a cellular network, such as GSM or CDMA, the Internet, WiMAX, or any other communications network configured to communicate with the PSAP 112. The PSAPs 112 may interact with the communications network 108 to retrieve additional information to help facilitate emergency services.

As not all wireless communications devices are configured to generate preformatted emergency data messages, a user may generate and communicate a freeform emergency data message (e.g., text message, e-mail, instant message, image message) to a network address, such as Internet domain name "911.911," for routing to a PSAP local to the user. A freeform emergency data message is any data message that is addressed and communicated to a network address for routing to a PSAP local to the user In one embodiment, the wireless communications device 104 communicates the emergency text message 106 over the wireless communications network 108 to emergency message router 110. The emergency message router 110 may be in communication with the communications network 108 and be configured to receive and distribute emergency text messages, such as emergency text message 106. Some data that the emergency message router 110 may use to route emergency text messages to the appropriate PSAP includes current user location information, such as a cell site ID code (CCID), also referred to as cell site coordinates, global positioning system (GPS) coordinates, or other available information in the emergency text message 106. Along with information stored in the emergency message router 110, as well as available on remote sources, the emergency message router 110 may then choose the most appropriate PSAP for message delivery. Given that there are many thousands of PSAPs, selection of the most appropriate or closest PSAP to the current location of the user who sent the emergency text message can be helpful to emergency personnel.

The PSAPs have a wide variety of capabilities depending upon the equipment and level of sophistication of the PSAP 112. For instance, some of the PSAPs 112 may have limited capabilities and be capable of receiving address information, call back number, and a person's name to which the calling phone number is registered. Other, more sophisticated PSAPs 112, may have the ability to receive GPS location coordinates, as well as other more detailed information. The emergency message router 110 may have knowledge of the capabilities of each of the PSAPs 112 and use this knowledge, in addition to distance or other location information, to determine the most appropriate PSAP for the message. Having an emergency message router 110 allows for an emergency network address, such as "911.911", to be used as a generic address, rather than individual users 102 having to input a specific PSAP address each time their location changes. The stored emergency network address may be any address, with "911.911" being just one example. Without the emergency message router 110, an emergency text message 106 may be delivered to a PSAP which either does not have the capability of receiving text messages or may not be the closest PSAP to the user 102. Within the PSAP may be one or more terminals having a PSAP display screen 114 for displaying the emergency text message 106. Any known or related information to the user who sent the emergency text message 106 may also be displayed on the PSAP display screen 114 upon receipt.

Figure 2:
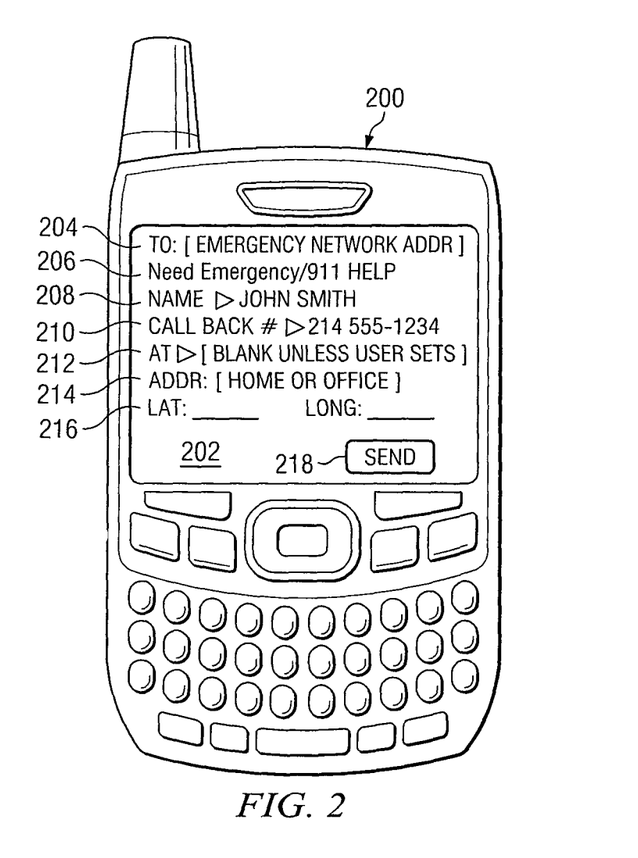
FIG. 2 is an illustration of one embodiment of a wireless communications device configured to communicate a preformatted emergency text message.

FIG. 2 is an illustration of one embodiment of a wireless communications device 200 configured to communicate an emergency text message. The wireless communications device 200 may include a display screen 202 for communicating visual data, such as text, to a user. In this embodiment, the display screen 202 depicts a number of fields used in populating a preformatted emergency text message. A recipient field 204 may include a genetic emergency message router address, such as "911.911", as described previously in FIG. 1. By default, the recipient field 204 may automatically be populated with the generic emergency message router address.

A message text field 206 may also be pre-populated with a default message, such as, "need emergency/911 help." In an alternative embodiment, the message text field may be entered manually and edited by the user. Alternatively, the message text field may be selected from a list of pre-defined emergency messages. A name field 208 may also be included for indicating the name of the person associated with a wireless communications device 200 that is communicating the emergency text message. In an alternative embodiment, the name field 208 may also be edited by the user replacing any default name in the field. A call back number field 210 may provide a PSAP with a number for contacting the user for more information regarding an emergency. The call back number 210 may not necessarily be a number directly associated with the wireless communication device 200, but rather may be a number associated with an emergency contact, such as a family member or friend. For example, some wireless communications devices 200 may have text capability, but not voice capability. Therefore, an attempt to call the wireless communication device may not work. Providing the call back number 210 belonging to a friend or family member may allow a person at the PSAP to obtain additional information that could prove helpful.

A current location field 212 may be populated by the user prior to communicating the emergency text message. Alternatively, the current location field 212 may be blank if the user chooses or does not have time to populate the current location field 212. While the current location field 212 may be useful in providing the PSAP with location information, it may not always be possible to have the current location field 212 updated or entered prior to sending the emergency text message. Because the current location field 212 may be blank, a permanent address field 214 may also be provided to send the PSAP. The permanent address may be the user's home or office, where additional information may likely be found. Even if the wireless communications device 200 is not located at the permanent address found in the permanent address field 212, having a permanent contact address may prove to be useful in the event an investigation or other information needs to be obtained at a later time.

GPS coordinate fields 216 may also be included to provide GPS coordinates to the PSAP if the wireless communications device 200 is GPS enabled. If the wireless communications device 200 is GPS enabled, latitude and longitude coordinates may be included in the emergency text message and communicated within the emergency text message to provide specific location information for locating the user with the wireless communications device 200. Frequently, GPS coordinate information will not be available because of location or environmental factors, such as being in a basement or a thickly walled building. Therefore, GPS coordinate information may not be available, even if the wireless communications device 200 is GPS enabled. Additionally, GPS coordinates may be requested from the communications network, as is described below in reference to FIG. 8. When the fields are populated, either by the user or automatically by the wireless communications device 200, a send button 218 may be activated to communicate the emergency text message. The fields may be pre-populated during a setup procedure, with the exception of GPS coordinate field 216, thereby allowing a user in an emergency situation to communicate the message without taking the time to input new information. Because the GPS coordinates are expected to vary over time, the GPS coordinates are automatically inserted by the wireless communications device 200 at the time of the emergency.

Figure 3:
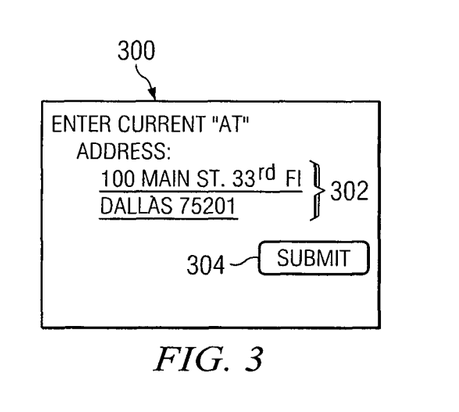
FIG. 3 is a screen shot of one embodiment of a display screen on a wireless communications device.

FIG. 3 is a screen shot of one embodiment of a display screen 300 on a wireless communications device. On the display screen 300, a user may be prompted to enter information into the current location field as described in FIG. 2. The current address input field 302 may be populated using a touch screen or keypad as available on the wireless communications device. The current address input field 302 may be altered at any time by the user. The current address of the user provides the PSAP with more specific information regarding the exact location of the wireless communications device. Upon completion of the address into the current address input field 302, a user may submit the information by selecting the submit button 304. In one embodiment, in order to avoid an incorrect current address or location information from being sent to the PSAP, the wireless communications device may be configured to clear the current location field when it is determined that the user has moved beyond a set distance, such as 50 feet. For example, if a user's CCID code or GPS coordinates have changed, the user would not want the current address field to incorrectly display location information in the event of an emergency. The wireless communications device may be configured to recognize the change and automatically clear out the current location field. In one embodiment, previous addresses may be stored and selectable by the user to make entering the address faster and easier.

Figure 4:
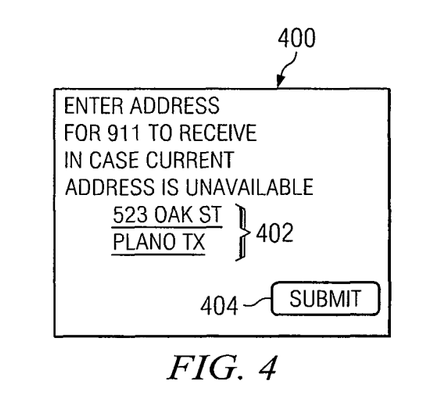
FIG. 4 is a screen shot of one embodiment of a display screen on a wireless communications device.

FIG. 4 is a screen shot of an embodiment of a display screen 400 on a wireless communications device. On the display screen 400, a user may be prompted to enter an address for the permanent address input field 402. The permanent address input field 402 may be the default address for use in the event that a current address is unavailable at the time an emergency text message is being sent by the user. The permanent address input field 402 may be associated with an emergency contact or may be the billing address associated with the wireless communications device. While the permanent address input field 402 may be updated at any time, generally, the permanent address field does not change as frequently as the current address field. In addition to user input, the permanent address input field may be populated based on billing data available over the network or another available data source. Upon population of the permanent address input field, the user may submit the information by selecting a submit button 404.

Figure 5:
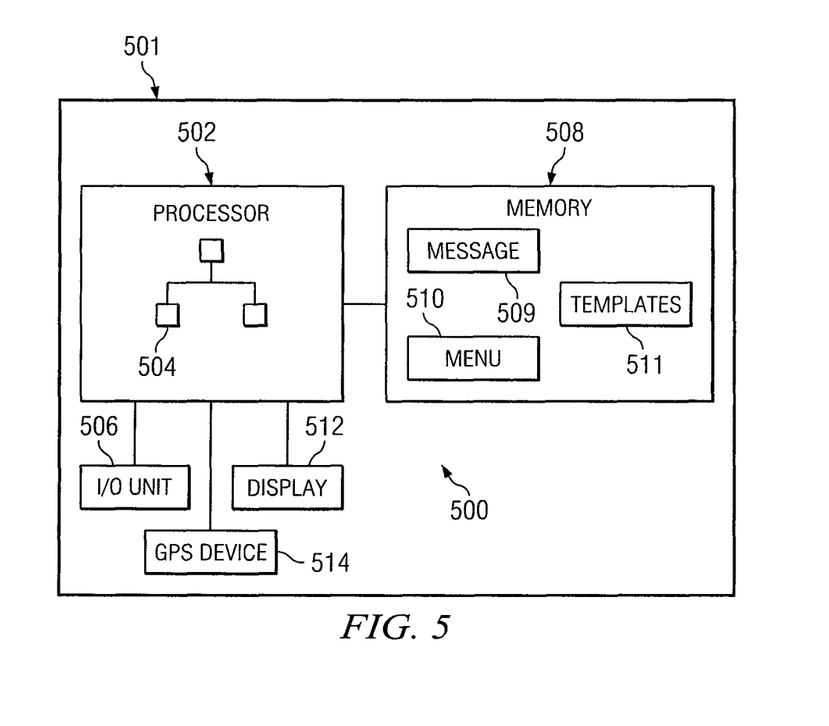
FIG. 5 is an illustration of one embodiment of components of a wireless communications device configured to communicate a preformatted emergency text message according to principles of the present invention.

FIG. 5 is an illustration of one embodiment of components 500 of a wireless communications device 501 configured to communicate a preformatted emergency text message according to principles of the present invention. The wireless communications device 501 may also include a processor 502 for processing the preformatted emergency text message. The processor 502 may execute software 504 capable of performing the functionality of the wireless communications device 501. The wireless communications device 501 may also include an input/output (I/O) unit 506 for communicating emergency text messages, as well as providing for the traditional functionalities of the wireless communication device 501, as commonly known in the art. The I/O unit 506 may additionally include a transceiver (not shown) for transmitting an emergency message to a PSAP or remote location and for receiving and sending communications as commonly performed by a wireless communications device 501.

A memory 508 may also be located within the wireless communications device 501 for storing data being processed by the processor 502, as well as user data (not shown) for use in generating a preformatted emergency text message 509. The memory 508 may be RAM, FLASH, or any other memory configured to operate in the wireless communication device 501. In addition to data being processed and the user data, the memory 508 may also store menu information 510 used in displaying menus for guiding a user of the wireless communications device 501 through creation of an emergency text message. Emergency text message templates 511 that define structure of text messages that are used to report different types of emergencies may also be stored in the memory 508. Depending on selections made by the user using the menus 510, a particular one of the emergency text message templates 511 may be selected for use in generating an emergency text message. Having different emergency text message templates 511 allows different information to be included or not included depending on the particular type of emergency selected by the user via the menus 510. For example, a fire emergency away from a user's home may not include the user's home address as would a medical emergency occurring at the user's home.

A display 512 for viewing data from the wireless communications device 501 may also be provided. The display 512 may also allow for a user to view an emergency text message that has been generated, edit the message, read replies, and perform many other functions of a display 512.

A GPS device 514 may also be provided within the wireless communications device 501. The GPS device 514 may be an electronic component or some other hardware, either integrated into the wireless communications device or in communication with the wireless communications device 501, which provides GPS enablement to the wireless communications device 501. GPS enablement allows for the wireless communications device 501 to be able to generate current GPS coordinates, which may be used within the emergency text message.

Figure 6:
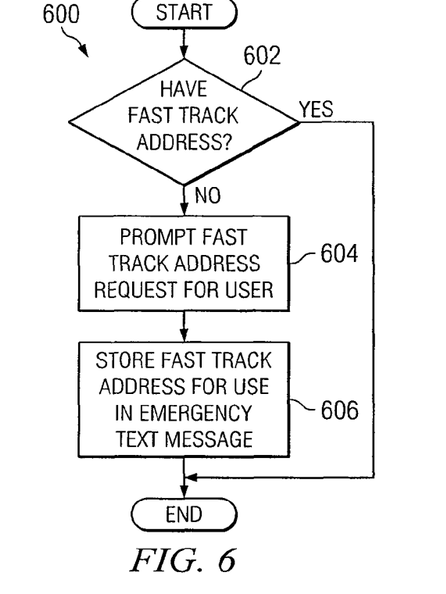
FIG. 6 is a flowchart of one embodiment for inputting a fast track address according to principles of the present invention.

FIG. 6 is a flow chart which is one embodiment of a method 600 for inputting a fast track address according to the principles of the present invention, where a fast track address may be considered the permanent address associated with a wireless communications device that enables a user to be quickly tracked by emergency personnel, as described previously. At step 602, a determination is made as to whether a fast track address has been stored. If a fast track address has been stored, the process ends. If there is no fast track address stored, in step 604, a user is prompted to enter a fast track address using the keypad or any other available input means on the wireless communications device. In step 606, the entered fast track address for use in the emergency text message may be stored. Upon initiating the communication of an emergency text message, there will be, at a minimum, a fast track address available for communication to the PSAP. Ideally, current location information would also be communicated. However, current location information may not always be available. The described process may occur at any time and is not limited to an initial setup. For example, a user wishing to update a fast track address may also have that option.

Figure 7:
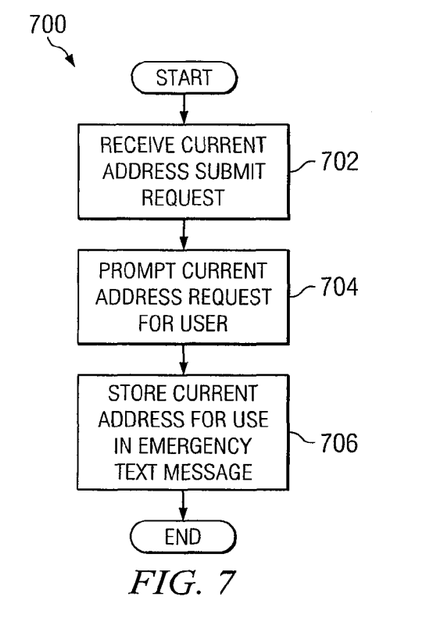
FIG. 7 is a flowchart of one embodiment of a method for inputting a current address location according to principles of the present invention.

FIG. 7 is a flow chart which is one embodiment of a method 700 for inputting a current address location according to principles of the present invention. At step 702, a wireless communications device may receive a request to submit a current address representing where the user is currently located. The request may be generated in response to an input (e.g., menu selection) by the user or the request may be automatically generated by the wireless communications device in the event that the wireless communications device recognizes a change in current location. In step 704, a user is prompted to enter the current address location. The current address location may be a street address, a landmark address, or any other similar address where emergency services may be able to locate the user. In step 706, a current address location for use in emergency text messages may be stored by the wireless communications device. As described previously, if a current address location is not entered by the user, this field may remain blank, thereby potentially reducing the usefulness of the emergency text message for users at the PSAP. However, having the current address location blanked after it is determined that the wireless communications device has moved removes the likelihood that incorrect location information would be stored or otherwise communicated to emergency services.

Figure 8:
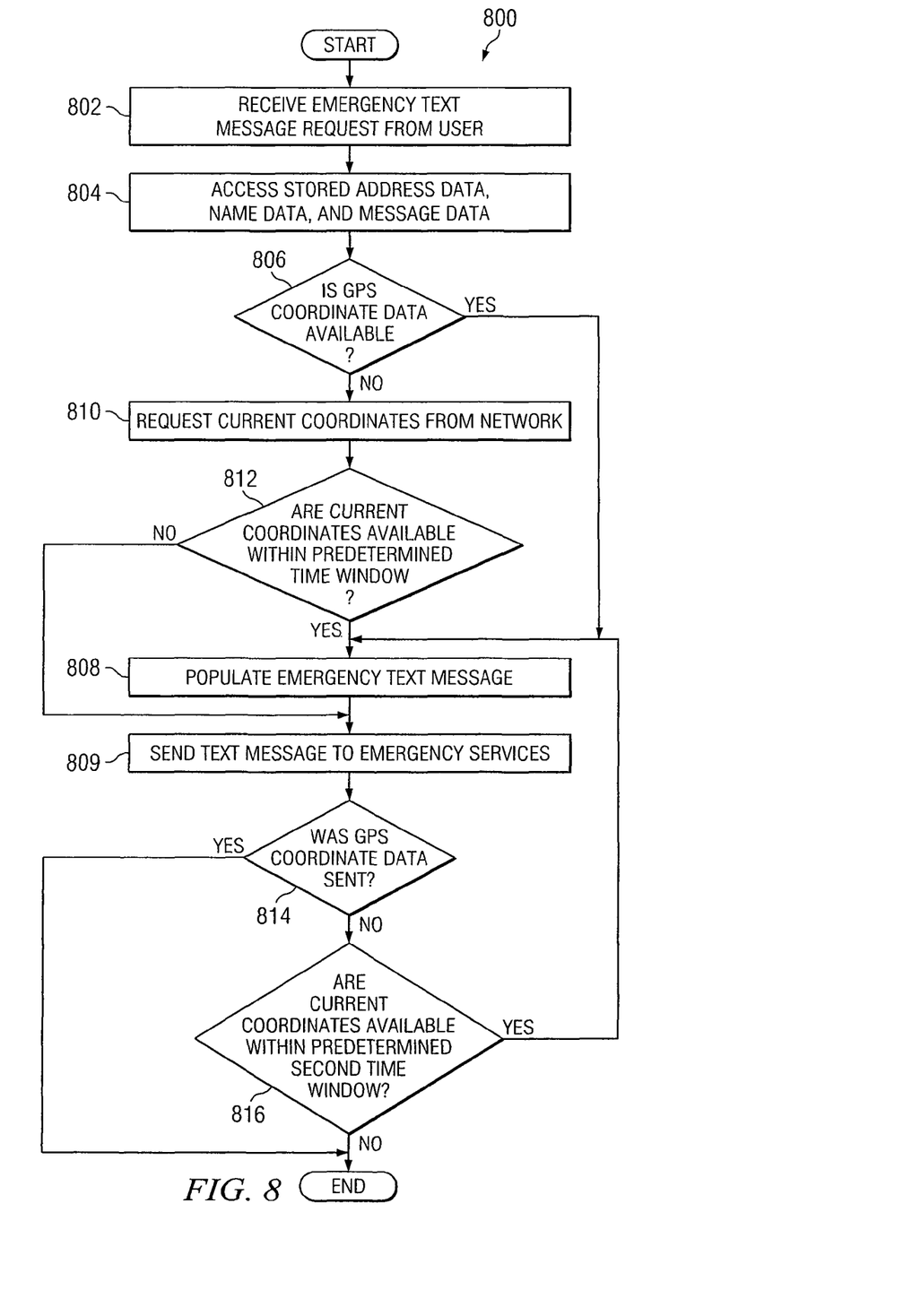
FIG. 8 is a flowchart of one embodiment of a method for communicating an emergency text message to a PSAP according to principles of the present invention.

FIG. 8 is one embodiment of a flow chart 800 for communicating an emergency text message to a PSAP according to principles of the present invention. In step 802, a wireless communications device receives an emergency text message request from a user. The emergency text message request may be initiated by a hard-button, a soft-button, or any other number of methods for initiating the request. In step 804, the wireless communications device may access the stored address data, name data, and message data that is available for populating an emergency text message. The stored data may be located within a wireless communications device itself, but may also be located remotely. Storing the data locally, however, insures that whether or not a communications link is presently available to a remote location including the data, the information will be available.

In step 806, a determination is made as to whether GPS coordinate data is available. If the wireless communications device is GPS enabled and the GPS coordinates are available, then at step 808, an emergency text message is populated with the GPS coordinates. The emergency text message is also populated with the stored information. In step 809, the emergency text message is sent to emergency services, such as a PSAP via a network router configured to identify and route the emergency message to a PSAP local to the user.

If the GPS coordinate data was not available in step 806, in step 810 a request may be made for coordinates that may be available from the network. Triangulation or other commonly known methods may be used by the network to determine GPS coordinate data. In step 812, a determination is made as to whether the current GPS coordinates are available within a predetermined time window. The predetermined time window may be anytime from a fraction of a second to multiple seconds and should provide sufficient time for coordinates to be made available from the network. If the current GPS coordinates are available within the predetermined time window from step 812, the emergency text message may be populated and then sent to emergency services complete with GPS coordinate data as described previously in steps 808 and 809. If the current GPS coordinates were not available within the predetermined time window, the emergency text message may be sent without GPS coordinate data in step 809. In step 814, a determination is made as to whether the GPS coordinate data was sent. If the GPS coordinate data was sent, the process ends. If the current GPS coordinates data were not sent, a second time window may be granted. In step 816, it may be determined whether GPS coordinates were available within the second time window. If the GPS coordinates data were available within the predetermined second time window, the emergency text message may be populated with the current GPS coordinates and sent to emergency services, as described in steps 808 and 809. If the GPS coordinates were not available within the second time window, the process ends.

Figure 9:
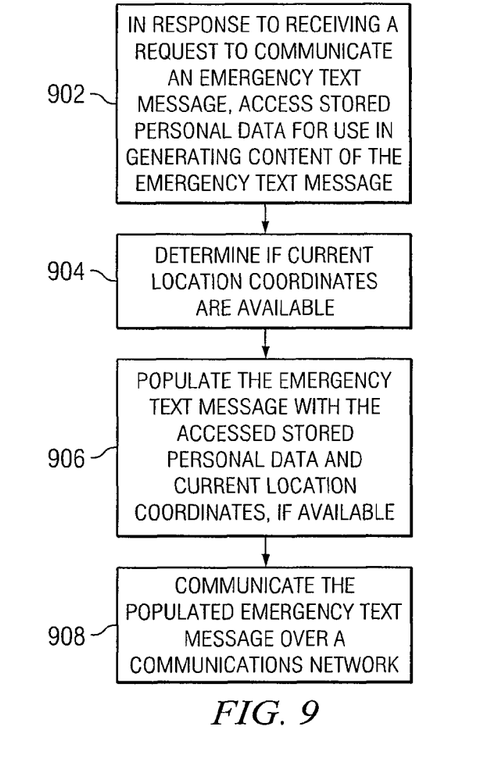
FIG. 9 is a flowchart of one embodiment of a method for communicating an emergency text message to a PSAP according to principles of the present invention.

FIG. 9 is a flowchart 900 of one embodiment for communicating an emergency text message to a PSAP according to principles of the present invention. In step 902, in response to receiving a request to communicate an emergency text message, stored personal data may be accessed for use in generating content of the emergency text message. Stored personal data may include names, addresses, phone numbers, and any other relevant information. In step 904, a determination is made as to whether current location coordinates are available. Current location coordinates may be provided by a GPS enabled wireless communications device or any available network in which the wireless communications device is in communication. The emergency text message may be populated in step 906 with the accessed stored personal data and current location coordinates, if available. In step 908, the populated emergency text message may be communicated over a communications network.

Figure 10:
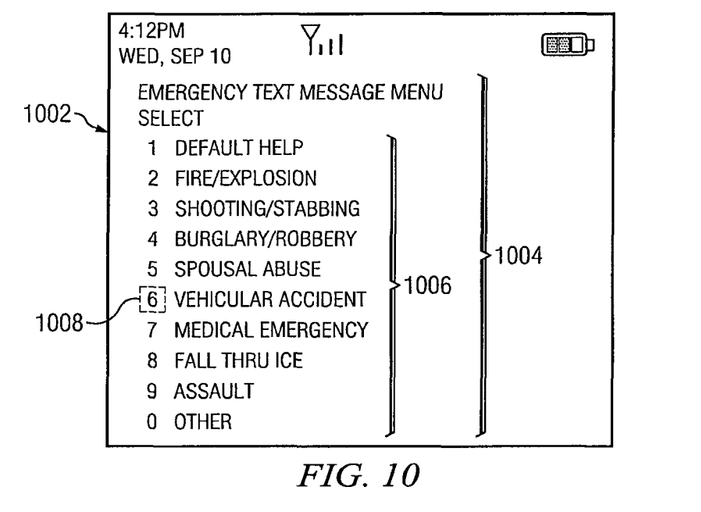
FIG. 10 is a screen shot of one embodiment of a display screen of a wireless communications device depicting an emergency text menu.

FIG. 10 is a screen shot of one embodiment of a display screen 1002 of a wireless communications device depicting an emergency message menu. An emergency message menu may be a menu for generating an emergency message, whether the message is generated for delivery by SMS or text, email, or any number of communications types. Depicted on the display screen 1002, is an emergency text message menu 1004. Within the emergency text message menu 1004, menu items 1006 describing various emergencies that can occur may be displayed. The emergency text message menu 1004 may be initiated by a hard-button or soft-button, as described above in FIG. 8. Other menu initiation methods, such as selecting an option (e.g., icon) from a display may also cause the emergency text message menu 1004 to be displayed.

Within the menu items 1006 that are listed, various emergency event types may be displayed, including a default selection, such as "SEND HELP, EMERGENCY," as well as an "other selection" for use in situations which are not specifically listed in the menu items 1006. In one embodiment, emergency event types may additionally be generated and stored by users for immediate, as well as future use. Also depicted in FIG. 10 is a menu selection 1008 indicative of item 6, "VEHICULAR ACCIDENT," being selected. Upon selecting the menu selection 1008, sub-menus, such as those listed in TABLES 1 and 2 below, may be displayed to aid the user in generating the emergency text message with appropriate information.

TABLE 1

FIRE/EXPLOSION SUB-MENUS

| LOCATION | |
|---|---|
| 1. | My Residence |
| 2. | House |
| 3. | Apartment |
| 4. | High Rise Apartment |
| 5. | Low Rise Business |
| 6. | Factory |
| 7. | Vehicle |
| 8. | Forest |
| 9. | Other |
| TYPE | |
| 1. | Regular Fire |
| 2. | Chemical |
| 3. | Bomb |
| 4. | Gas Tank |
| 5. | . . . |

TABLE 1 depicts an example of a sub-menu that may be displayed when "FIRE/EXPLOSION" is selected from the menu items 1006. The first sub-menu that may be displayed for "FIRE" is a location listing, including "MY RESIDENCE," "HOUSE," "APARTMENT," etc. The most relevant location may be selected by the user and stored for inserting into the emergency text message in a location field. After selecting the location, a sub-menu regarding particular types of fire may be displayed. For example, if a fire was caused by a gas tank, a user selects option "4" to indicate the nature of the fire. Additional information entered by the user may be provided within the emergency text message. Information identifying the user and his or her location may also be provided in the emergency text message. It should be understood that the sub-menus may be displayed separately or on a single screen.

TABLE 2

VEHICULAR ACCIDENT SUB-MENUS

| VEHICLES | INJURIES | NUMBER | SITUATION |
|---|---|---|---|
| 1. Single Automobile | 1. None | 1. None | 1. None |
| 2. Multiple Automobiles | 2. Minor | 2. One | 2. Fire |
| 3. Tractor Trailer | 3. Serious | 3. Two | 3. Chemical Leak |
| 4. Train | 4. Death | 4. Many | |
| 5. Motorcycle | 5. Death and Serious | 5. . . . | 4. Explosion |
| 6. Boat | | | 5. Water |
| 7. Bicycle & Vehicle | | | 6. Off Cliff |
| 8. Airplane | | | 7. . . . |
| 9. Bus | | | |

TABLE 2 depicts another set of sub-menus that may be displayed upon the user selecting option 6, "VEHICULAR ACCIDENT," of the menu items 1006. The first sub-menu that may be displayed, "VEHICLES," is a listing of vehicles to give emergency services an idea of the type of vehicle(s) they may encounter. In this example, option 2, "MULTIPLE AUTOMOBILES," may be selected. After selection of the type of vehicles, a listing of injuries that may be known may also be displayed. In this example, option 2, "MINOR," may be selected, indicating there may be minor injuries caused by the accident. Following the selection of the severity of the injuries, another menu regarding the number of people involved may be displayed. In this case, selection 3, which represents two people being injured, may be selected. Next, another menu regarding a particular situation surrounding the accident may be displayed under the heading "SITUATION." For this example, option 1, "NONE," may be selected. Depending upon the particular type of emergency (e.g., medical emergency, fire/explosion, assault, etc.), different types or different numbers of menus may be displayed to assist a user in generating relevant information for an emergency text message.

Figure 11:
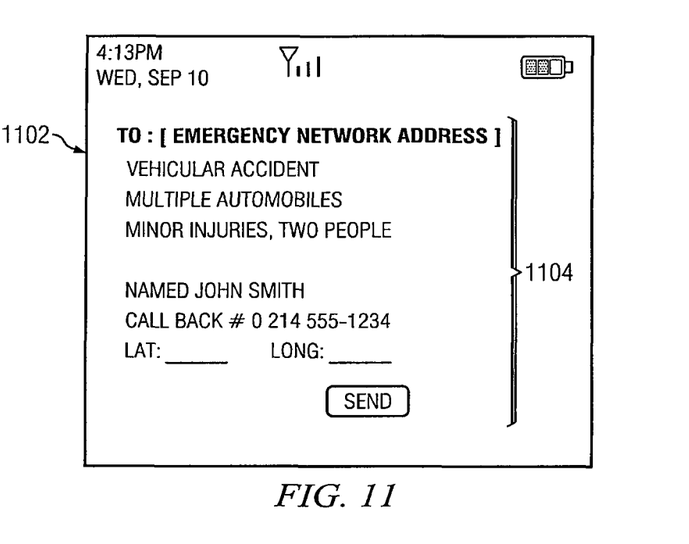
FIG. 11 is a screen shot of one embodiment of a display screen on a wireless communications device depicting an emergency text message template.

FIG. 11 is a screen shot of one embodiment of a display screen 1102 on a wireless communications device depicting an emergency text message template. In this embodiment, the menu selections described in TABLE 2 has been used to populate an emergency text message template 1104. Various text message fields, such as a recipient field or an emergency type field, have been automatically populated based on responses to the menu selections previously made by the user. For example, in the emergency text message template 1104, the recipient field labeled "TO:" may be automatically populated with an emergency network address, such as "911.911," where an appropriate PSAP may be determined based on location of the user. The next three fields may be populated based on the menu selections previously made. For example, the first field describes the emergency type which is the menu selection 1008, "VEHICULAR ACCIDENT." The next two lines displayed are from sub-menu selections as described in TABLE 2. For example, selection 2, "MULTIPLE AUTOMOBILES", was made, and therefore, is displayed in the emergency text message. The severity of injuries was selected as "MINOR," and the "NUMBER" selected indicates that "TWO" people were injured. The selections appear on the next line in the emergency text message. The situation in which the vehicular accident occurred was selected as "NONE", therefore, that field remains blank in the emergency text message. The emergency text message 1104 also contains a name field which may be automatically populated as described previously, as well as a call back number field which may also be populated automatically. In addition to fields being automatically populated, a user may be allowed to edit any field manually before sending the emergency text message. As understood in the art, the number of characters available to be sent in an SMS message is 160 or less, so the template is limited to that parameter.

Also displayed in the emergency text message template 1104 are location coordinate fields (e.g., GPS coordinates) for latitude and longitude of the wireless communications device. Depending on the type of emergency, these fields may or may not be displayed, as sometimes their relevance is less important for the particular emergency type. For example, if a user is reporting an accident in which they previously drove past, the current location coordinates may not be where emergency services should be directed. In one embodiment, another sub-menu (not shown) may allow a user to enter whether or not the current location coordinates should be included within the emergency text message or whether an address or intersection should be entered in.

Figure 12:
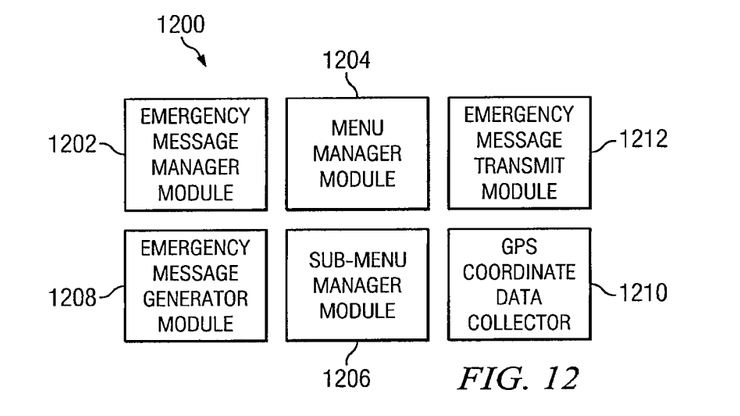
FIG. 12 is a block diagram of illustrative modules used for battery management as well as communication of an emergency message, according to principles of the present invention.

FIG. 12 is a block diagram of illustrative modules 1200 used for the generation and communication of an emergency message according to the principles of the present invention. An emergency message manager module 1202 may be provided for overall management of generating and sending an emergency text message within a wireless communications device. The emergency message manager module 1202 may be responsible for coordinating data flow through additional modules or may be primarily responsible for all the activities involved in the generation of emergency text messages. All different types of emergency text messages, including default messages where a menu is not provided to a user, as well as emergency text messages created through the use of menus, may be generated and communicated using the emergency text message module 1202.

For generating emergency text messages using a menu, a menu manager module 1204 may be provided for managing the various menus that are used in the generation of the emergency text messages. The menu manager module 1204 may be responsible for providing choices for user selection, accepting input for user selection, storing the user selection, and using the user selection to generate other menus or sub-menus for the user. As described previously, depending upon a particular emergency type, different types of information may be requested from the user to provide to emergency services. While the menu manager module 1204 may be responsible for the menus and sub-menus generated and displayed to the user, a sub-menu manager module 1206 may additionally be provided for managing various sub-menus. The sub-menu manager module 1206, as with the menu manager module 1204, may be responsible for generating sub-menus, accepting input from the user, storing input from the user, and determining which sub-menu to display subsequently, if at all.

An emergency message generator module 1208 may be provided for generating an emergency text message using the selection made by a user who has entered selections from the menu. Additionally, the emergency message generator module 1208 may simply issue a default emergency text message in the event the user requests to send an emergency message without using the menu system. The emergency message generator module 1208 may be a stand alone module that gets called from the emergency message manager module or may be called as a subroutine of the menu manager module 1204 or sub-menu manager module 1206. By using inputs selected by the user using the menu or automatically generated by the wireless communications device (e.g., GPS data coordinates), the emergency message generator module 1208 may generate the emergency text messages for communication to emergency services.

A GPS coordinate data collector module 1210 may determine GPS coordinate data by the wireless communications device or request GPS coordinate data from network sources as previously described. The emergency message generator module 1208 may query the GPS coordinate data collector module 1210 for GPS coordinate data to be entered into the emergency text message where appropriate. An emergency message transmit module 1212 may also be provided for transmitting an emergency text message to emergency services, such as a PSAP. The emergency transit module 1212 may be in communication with an emergency message router as described in FIG. 1 in order to locate an appropriate PSAP for delivery of the emergency text message. Alternatively, the emergency message transmit module 1212 may use a default address and/or a manually entered address in transmitting the emergency text message.

Figure 13:
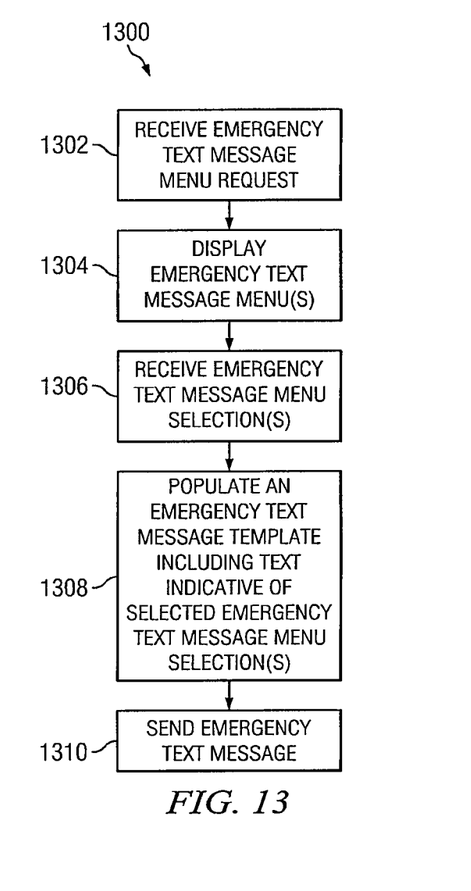
FIG. 13 is a flowchart of one embodiment of a method for sending an emergency text message according to principles of the present invention.

FIG. 13 is a flow chart of one embodiment of a method 1300 for sending an emergency text message according to principles of the present invention. In step 1302, an emergency text message menu request may be received. The emergency text message menu request may be generated by a hard or soft-button or by selecting an option within a wireless communications device main menu, as is well known in the art.

In step 1304, one or more emergency text message menus may be displayed. In one embodiment, a main menu listing various types of emergencies may lead to a listing of sub-menus regarding related information typically necessary or helpful to emergency services. Using the sub-menus helps to guide the user through the generation of the emergency text message rather than a free form text entry, so as to be faster and standardized. The user may be allowed to view and select a menu selection with the selected emergency text message menu selections being received in step 1306.

In step 1308, an emergency text message template may be populated by using text indicative of selected emergency text message menu selections. Once the text message menu selections, default, and other available information have populated the emergency text message template, the emergency text message, in step 1310, the generated emergency text message may be sent to the PSAP. It should be understood that certain information may be omitted, if unavailable, when sending the emergency text message. For example, if the geographies are unavailable due to being in a building without GPS satellite reception, then the emergency text message may be sent to the PSAP without the geographic coordinates, thereby allowing a user to report an emergency. An operator at the PSAP may follow up with the user via a telephone using the telephone number received in the emergency text message to determine the precise location or address of the emergency.

Although the principles of the present have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for sending an emergency text message, said method comprising:
   receiving a request for an emergency message menu by a user for selection of an emergency event type;
   displaying an emergency message menu with a list of selectable emergency event types;
   in response to receiving a selected emergency event type, displaying at least one sub-menu associated with the selected emergency event type;
   collecting selected sub-menu selections;
   selecting an emergency text message template that includes text message fields, at least one of the text message fields indicative of the selected emergency event type and each of the collected sub-menu selections;
   displaying the emergency text message template including the text message fields with the at least one of the text message fields displaying the selected emergency event type and each of the collected sub-menu selections; and
   sending the emergency text message over a communications network to a public safety answering point.

2. The method according to claim 1, further comprising:
   accessing a stored emergency network address; and
   wherein sending the emergency text message includes sending the emergency text message to the emergency network address for determination of an appropriate public safety answering point to distribute the emergency text message.

3. The method according to claim 1, wherein the emergency text message is preformatted and personal data and current location coordinates, when available, are inserted in preformatted data fields.

4. The method according to claim 3, further comprising:
   if current location coordinates are not currently locally available, requesting current location coordinates from the communications network; and
   populating the emergency text message with the current location coordinates if received from the communications network.

5. The method according to claim 1, further comprising sending an abbreviated dialing code in addition to the text message to the communications network.

6. The method according to claim 1, further comprising, in response to an emergency message request, skipping displaying an emergency message menu and sending a default emergency text message to the public safety answering point.

7. A wireless communications device, comprising:
   a memory storing personal data of a user;
   an input/output (I/O) unit configured to communicate with a communications network;
   a user interface; and a processing unit in communication with said memory, I/O unit, and user interface, and configured to:
receive a request for an emergency message menu by a user for selection of an emergency event type;
display an emergency message menu with a list of selectable emergency event types;
in response to receiving a selected emergency event type, display at least one sub-menu associated with the selected emergency event type;
collect selected sub-menu selections;
generate an emergency text message template that includes text message fields, at least one of the text message fields indicative of the selected emergency event type and each of the collected sub-menu selections; and
display the emergency text message template including the text message fields with the at least one of the text message fields displaying the selected emergency event type and each of the collected sub-menu selections; and
send the emergency text message.

8. The wireless communications device according to claim 7, wherein said processing unit is further configured to:
access a stored emergency network address to which the emergency text message is to be sent; and
send the emergency text message to the emergency network address for determination of an appropriate public safety answering point to distribute the emergency text message.

9. The wireless communications device according to claim 8, wherein said processing unit is further configured to access a stored emergency network address; and wherein the emergency text message is preformatted and personal data and current location coordinates, when useful, are positioned in preformatted data fields.

10. The wireless communications device according to claim 9, wherein said processing unit is further configured to:
if current location coordinates are not currently locally available, request current location coordinates from the communications network; and
populate the emergency text message with the current location coordinates if received from the communications network.

11. The wireless communications device according to claim 7, wherein said processing unit is further configured to send an abbreviated dialing code.

12. The wireless communications device according to claim 7, wherein said processing unit is further configured to, in response to an emergency message request, skip displaying an emergency message menu and send a default emergency text message to a public safety answering point.

13. A wireless communications device, comprising:
an emergency message manager module configured to store a template of an emergency text message;
a menu manager module configured to store and display menu item selections, the menu item selections identifying different emergency event types, said menu manager module being further configured to accept a selection of an emergency event type;
a sub-menu manager module configured to store and display sub-menu item selections, the sub-menu item selections being associated with menu item selections and identifying emergency event types, said sub-menu manager module being further configured to accept a selection of sub-menu items; and
an emergency message generator module configured to use the template of the emergency text message, generate an emergency text message, and display the emergency text message template including text message fields with at least one of the text message fields displaying the selected emergency event type and each of the selected sub-menu items.

14. The wireless communications device according to claim 13, wherein the sub-menu manager module is further configured to group items based on emergency event type.

15. The wireless communications device according to claim 13, further comprising an emergency message transmit module.

16. The wireless communications device according to claim 13, further comprising a GPS coordinate data collector module.

* * * * *